United States Patent
Shao et al.

(10) Patent No.: US 12,181,859 B2
(45) Date of Patent: Dec. 31, 2024

(54) METHODS AND INTERNET OF THINGS SYSTEMS FOR MAINTAINING LOW-TEMPERATURE PIPELINE BASED ON SMART GAS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Lei Zhang, Chengdu (CN); Yong Li, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 185 days.

(21) Appl. No.: 18/150,183

(22) Filed: Jan. 4, 2023

(65) Prior Publication Data
US 2023/0147487 A1    May 11, 2023

(30) Foreign Application Priority Data
Dec. 20, 2022 (CN) .......................... 202211635866.0

(51) Int. Cl.
*G05B 19/4155* (2006.01)
(52) U.S. Cl.
CPC .......... *G05B 19/4155* (2013.01); *G05B 2219/50333* (2013.01)
(58) Field of Classification Search
None
See application file for complete search history.

(56) References Cited

U.S. PATENT DOCUMENTS

2021/0222904 A1  7/2021  Kim et al.
2021/0332796 A1*  10/2021  Zhou ................. F03D 7/045

FOREIGN PATENT DOCUMENTS

| CN | 109958588 A | 7/2019 |
| CN | 111047844 A | 4/2020 |
| CN | 113177353 A | 7/2021 |

(Continued)

OTHER PUBLICATIONS

Decision to Grant a Patent in Chinese Application No. 202211635866.0 mailed on May 17, 2024, 5 pages.

(Continued)

*Primary Examiner* — Ryan A Jarrett
(74) *Attorney, Agent, or Firm* — METIS IP LLC (57) ABSTRACT

The embodiments of the present disclosure provide methods and Internet of Things systems for maintaining a low-temperature pipeline based on smart gas. The method may be implemented by a smart gas safety management platform of an Internet of Things system for maintaining the low-temperature pipeline based on smart gas. The method may include: obtaining gas data and pipeline data of each segment of a gas pipeline and weather data of a position of each segment of the gas pipeline; determining at least one target pipeline; determining icing data of the at least one target pipeline based on the gas data, the pipeline data, and the weather data; and generating a thawing instruction based on the icing data, and controlling a natural gas heating device to perform a thawing operation on the at least one target pipeline based on the thawing instruction.

10 Claims, 5 Drawing Sheets

(56) References Cited

FOREIGN PATENT DOCUMENTS

| | | |
|---|---|---|
| CN | 113486494 A | 10/2021 |
| CN | 114329894 A | 4/2022 |
| CN | 114387129 A | 4/2022 |
| CN | 114756575 A | 7/2022 |
| CN | 114880818 A | 8/2022 |
| CN | 114970308 A | 8/2022 |
| CN | 115330094 A | 11/2022 |
| CN | 115355447 A | 11/2022 |
| WO | 2022247519 A1 | 12/2022 |

OTHER PUBLICATIONS

First Office Action in Chinese Application No. 202211635866.0 mailed on Apr. 8, 2024, 17 pages.

Yu, Tao et al., Research on Intelligentization of Long-Distance Pipeline Based on Data Mining Technology, Natural Gas and Oil, 38(2): 1-7, 2020.

Li, Yang et al., Application of intelligent pipeline monitoring system of iron tower in inspection of heating pipe network, District Heating, 2020, 7 pages.

Zhang, Chaoyang et al., Intelligent heating management mode of gas-steam combined cycle unit, State-owned enterprise management, 2019, 7 pages.

\* cited by examiner

METHODS AND INTERNET OF THINGS SYSTEMS FOR MAINTAINING LOW-TEMPERATURE PIPELINE BASED ON SMART GAS

CROSS-REFERENCE TO RELATED APPLICATIONS

This application claims priority of Chinese Patent Application No. 202211635866.0, filed on Dec. 20, 2022, the entire contents of which are hereby incorporated by reference.

TECHNICAL FIELD

The present disclosure relates to the field of maintaining a low-temperature gas pipeline, and in particular, to methods and Internet of Things systems for maintaining a low-temperature pipeline based on smart gas.

BACKGROUND

In a gas pipeline, condensed water often forms because impurities in the gas are not removed cleanly. When the ambient temperature is low (e.g., in winter), a large amount of condensation of the condensed water may cause the gas pipeline to freeze, which may affect gas transportation.

Therefore, it is desirable to provide methods and Internet of Things systems for maintaining a low-temperature pipeline based on smart gas, to realize the monitoring of a condition of the gas pipeline in a low-temperature environment, and guarantee the normal operation of the gas pipeline in the low-temperature environment.

SUMMARY

One or more embodiments of the present disclosure may provide a method for maintaining a low-temperature pipeline based on smart gas. The method may be implemented by a smart gas safety management platform of an Internet of Things system for maintaining the low-temperature pipeline based on smart gas. The method may include: obtaining gas data and pipeline data of each segment of a gas pipeline and weather data of a position of each segment of the gas pipeline; determining at least one target pipeline; determining icing data of the at least one target pipeline based on the gas data, the pipeline data, and the weather data; generating a thawing instruction based on the icing data, and controlling a natural gas heating device to perform a thawing operation on the at least one target pipeline based on the thawing instruction.

One or more embodiments of the present disclosure provide an Internet of Things system for maintaining a low-temperature pipeline based on smart gas. The Internet of Things system may include a smart gas user platform, a smart gas service platform, a smart gas safety management platform, a smart gas pipeline network device sensor network platform, and a smart gas pipeline network device object platform that interact in sequence. The smart gas safety management platform may include a smart gas pipeline network safety management sub-platform and a smart gas data center. The smart gas data center may obtain gas data and pipeline data of at least one gas pipeline and weather data of a position of the at least one gas pipeline through the smart gas pipeline network device sensor network platform, and send the gas data and the pipeline data of the at least one gas pipeline and the weather data of the position of the at least one gas pipeline to the smart gas pipeline network safety management sub-platform. The at least one gas pipeline may be configured in the smart gas pipeline network device object platform. The smart gas safety management platform may be configured to perform operations including: obtaining gas data and pipeline data of the at least one gas pipeline, and the weather data of the position of the at least one gas pipeline; determining at least one target pipeline; determining icing data of the at least one target pipeline based on the gas data, the pipeline data, and the weather data; generating a thawing instruction based on the icing data, and sending the thawing instruction to the smart gas data center, and sending the thawing instruction to the smart gas pipeline network device object platform corresponding to the target pipeline through the smart gas pipeline network device sensor network platform to control a natural gas heating device to perform a thawing operation on the at least one target pipeline. The natural gas heating device may be configured in the smart gas pipeline network device object platform.

One or more embodiments of the present disclosure may provide a non-transitory computer-readable storage medium storing computer instructions. When the computer instructions are executed by a processor, the method for maintaining a low-temperature pipeline based on smart gas may be implemented.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

Figure 1:
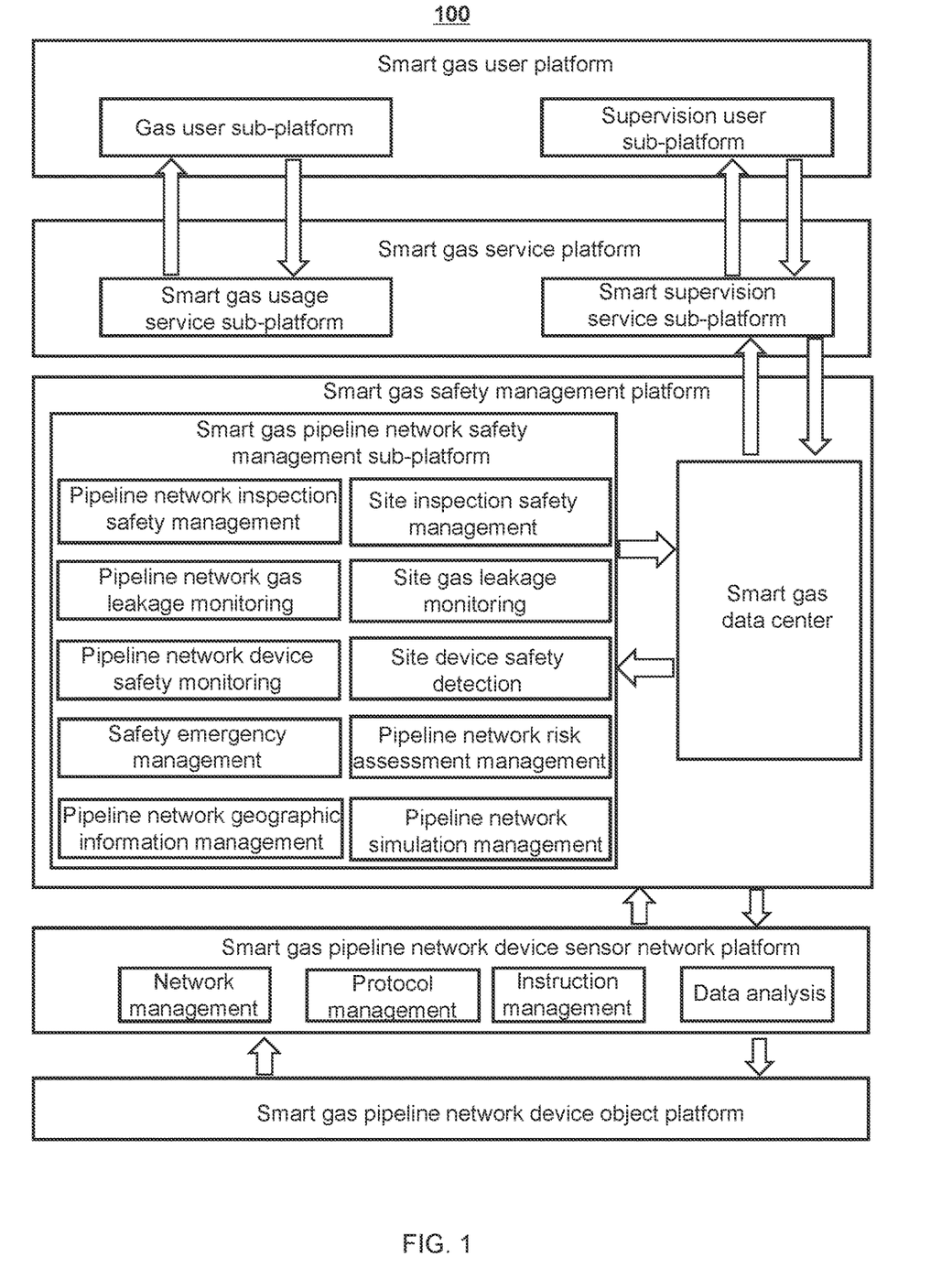
FIG. 1 is a platform structure schematic diagram illustrating an Internet of Things system for maintaining a low-temperature pipeline based on smart gas according to some embodiments of the present disclosure.

FIG. 1 is a platform structure schematic diagram illustrating an Internet of Things system for maintaining a low-temperature pipeline based on smart gas according to some embodiments of the present disclosure. In some embodiments, the Internet of Things system 100 for maintaining a low-temperature pipeline based on smart gas may include a smart gas user platform, a smart gas service platform, a smart gas safety management platform, a smart gas pipeline network device sensor network platform, and a smart gas pipeline network device object platform that interact in sequence.

The smart gas user platform may refer to a platform that is dominated by a user and interacts with the user. The user may be a gas user, a supervision user, etc. In some embodiments, the smart gas user platform may be configured as a terminal device. For example, the terminal device may include a mobile device, a tablet computer, or the like, or any combination thereof. In some embodiments, the smart gas user platform may feed back information to the user through the terminal device. For example, the smart gas user platform may feed back gas usage safety warning information to the user through the terminal device (e.g., a display).

In some embodiments, the smart gas user platform may include a gas user sub-platform and a supervision user sub-platform. The gas user sub-platform may be aimed at the gas user. The gas user may refer to a user who actually uses gas, such as a consumer, etc. The supervision user sub-platform may be aimed at the supervision user and may realize supervision of operation of the entire Internet of Things system. The supervision user may refer to a user of a gas safety supervision department.

In some embodiments, the gas user sub-platform may perform data interaction with a smart gas usage service sub-platform of the smart gas service platform. For example, the gas user sub-platform may issue a query instruction about gas usage safety to the smart gas usage service sub-platform of the smart gas service platform. As another example, the gas user sub-platform may receive the gas usage safety warning information, etc. uploaded by the smart gas usage service sub-platform of the smart gas service platform.

In some embodiments, the supervision user sub-platform may perform data interaction with a smart supervision service sub-platform of the smart gas service platform. For example, the supervision user sub-platform may issue a query instruction about monitoring a low-temperature pipeline to the smart supervision service sub-platform of the smart gas service platform. As another example, the supervision user sub-platform may receive monitoring information (including whether the gas pipeline is icing, a specific condition of icing, etc.) of a low-temperature pipeline uploaded by the smart supervision service sub-platform of the smart gas service platform.

The smart gas service platform may be a platform for receiving and transmitting data and/or information. The smart gas service platform may perform data interaction with the smart gas user platform and the smart gas safety management platform. For example, the smart gas service platform may upload the gas usage safety warning information and the monitoring information of a low-temperature pipeline to the smart gas user platform.

In some embodiments, the smart gas service platform may include the smart gas usage service sub-platform and the smart supervision service sub-platform. The smart gas usage service sub-platform may perform interaction with the gas user sub-platform to provide the gas user with the gas usage safety warning information. The smart supervision service sub-platform may perform data interaction with the supervision user sub-platform and the smart gas safety management platform to provide the gas user with the monitoring information of a low-temperature pipeline.

In some embodiments, the smart supervision service sub-platform may perform interaction with the smart gas safety management platform. For example, the smart supervision service sub-platform may issue the query instruction about monitoring a low-temperature pipeline. As another example, the smart supervision service sub-platform may receive the monitoring information of a low-temperature pipeline uploaded by the smart gas safety management platform.

The smart gas safety management platform may refer to a platform for over planning and coordinating connection and collaboration among various functional platforms. In some embodiments, the smart gas safety management platform may include a smart gas data center and a smart gas pipeline network safety management sub-platform. The smart gas pipeline network safety management sub-platform may perform interaction with the smart gas data center in two directions.

The smart gas data center may summarize and store all operation data of the Internet of Things system 100 for maintaining a low-temperature pipeline based on smart gas. In some embodiments, the smart gas safety management platform may perform data interaction with the smart gas pipeline network device sensor network platform and the smart gas service platform (e.g., the smart supervision service sub-platform) through the smart gas data center. For example, the smart gas data center may receive the query instruction about monitoring a low-temperature pipeline transmitted by the smart gas service platform, and transmit the query instruction to the smart gas pipeline network device object platform. For example, the smart gas data center may receive monitoring data (e.g., including gas data and pipeline data of each segment of a gas pipeline, weather data of a position of each segment of a gas pipeline, etc.) of a low-temperature pipeline uploaded by the smart gas pipeline network device object platform, and may send the monitoring data to the smart gas pipeline network safety management sub-platform for analysis and processing. As another example, the smart gas data center may receive the monitoring information of a low-temperature pipeline processed by the smart gas pipeline network safety management sub-platform, and feed back the monitoring data to the smart gas user platform through the smart gas service platform.

The smart gas pipeline network safety management sub-platform may obtain all the operation data of the Internet of Things system 100 for maintaining a low-temperature pipeline based on smart gas through the smart gas data center, and perform analysis and processing. For example, the smart gas pipeline network safety management sub-platform may determine at least one target pipeline, determine icing data of the at least one target pipeline based on the gas data, the pipeline data, and the weather data, generate a thawing instruction based on the icing data, send the thawing instruction to the smart gas data center, and send the thawing instruction to the smart gas pipeline network device object platform corresponding to the target pipeline through the smart gas pipeline network device sensor network platform to control a natural gas heating device to perform a thawing operation on the at least one target pipeline.

In some embodiments, the smart gas pipeline network safety management sub-platform may be configured to realize functions of pipeline network inspection safety management, site inspection safety management, pipeline network gas leakage monitoring, site gas leakage monitoring, pipeline network device safety monitoring, site device safety detection, safety emergency management, pipeline network risk assessment management, pipeline network geographic information management, pipeline network simulation management, etc. The pipeline network device safety monitoring may include checking historical safety data and current safety operation data of operation of a pipeline network device (including a gas pipeline, a flow meter, a pressure gauge, etc.) in the smart gas pipeline network device object platform. The safety emergency management may include forming an emergency response plan based on a safety risk of the pipeline network device. For example, the emergency response plan for thawing may be formed based on the icing condition of the gas pipeline. The pipeline network risk assessment management may include combining basic pipeline network data and operational data to form a pipeline network safety risk assessment based on a preset model, grading the safety risk based on an assessment situation, and combining a geographic information system (GIS) to perform three-dimensional visualization management with different color differentiation. The pipeline network geographic information management may include viewing geographic information and attribute information of the pipeline and the device in real-time to provide data support for on-site operation.

The smart gas pipeline network device sensor network platform may be a functional platform for managing sensor communication. In some embodiments, the smart gas pipeline network device sensor network platform may be configured as a communication network and a gateway for performing network management, protocol management, instruction management, data analysis, or any combination thereof.

In some embodiments, the smart gas pipeline network device sensor network platform may perform data interaction with the smart gas safety management platform and the smart gas pipeline network device object platform to realize functions of perceptual information sensor communication and control information sensor communication. For example, the smart gas pipeline network device sensor network platform may receive the monitoring data of a low-temperature pipeline uploaded by the smart gas pipeline network device object platform, or issue the query instruction about monitoring a low-temperature pipeline to the smart gas pipeline network device object platform. As another example, the smart gas pipeline network device sensor network platform may receive the query instruction about monitoring a low-temperature pipeline issued by the smart gas data center, and upload the monitoring data of a low-temperature pipeline to the smart gas data center.

The smart gas pipeline network device object platform may refer to a functional platform for obtaining perceptual information. In some embodiments, the smart gas pipeline network device object platform may be configured as at least one pipeline network device. The pipeline network device may include a device such as a gas pipeline, a flow meter, a pressure gauge, etc. In some embodiments, the smart gas pipeline network device object platform may perform data interaction with the smart gas pipeline network device sensor network platform, and upload the obtained monitoring data of a low-temperature pipeline to the smart gas pipeline network device sensor network platform.

It should be noted that the above description of the Internet of Things system and components thereof is merely for convenience of illustration, and not intended to limit the present disclosure to the scope of the illustrated embodiments. It may be understood that for those skilled in the art, after understanding the principle of the system, it is possible to arbitrarily combine the various components, or form a subsystem to connect with other components without departing from the principle. For example, the smart gas service platform and the smart gas safety management platform may be integrated into one component. As another example, each component may share one storage device, and each component may also have its own storage device. Such deformations are within the protection scope of the present disclosure.

Figure 2:
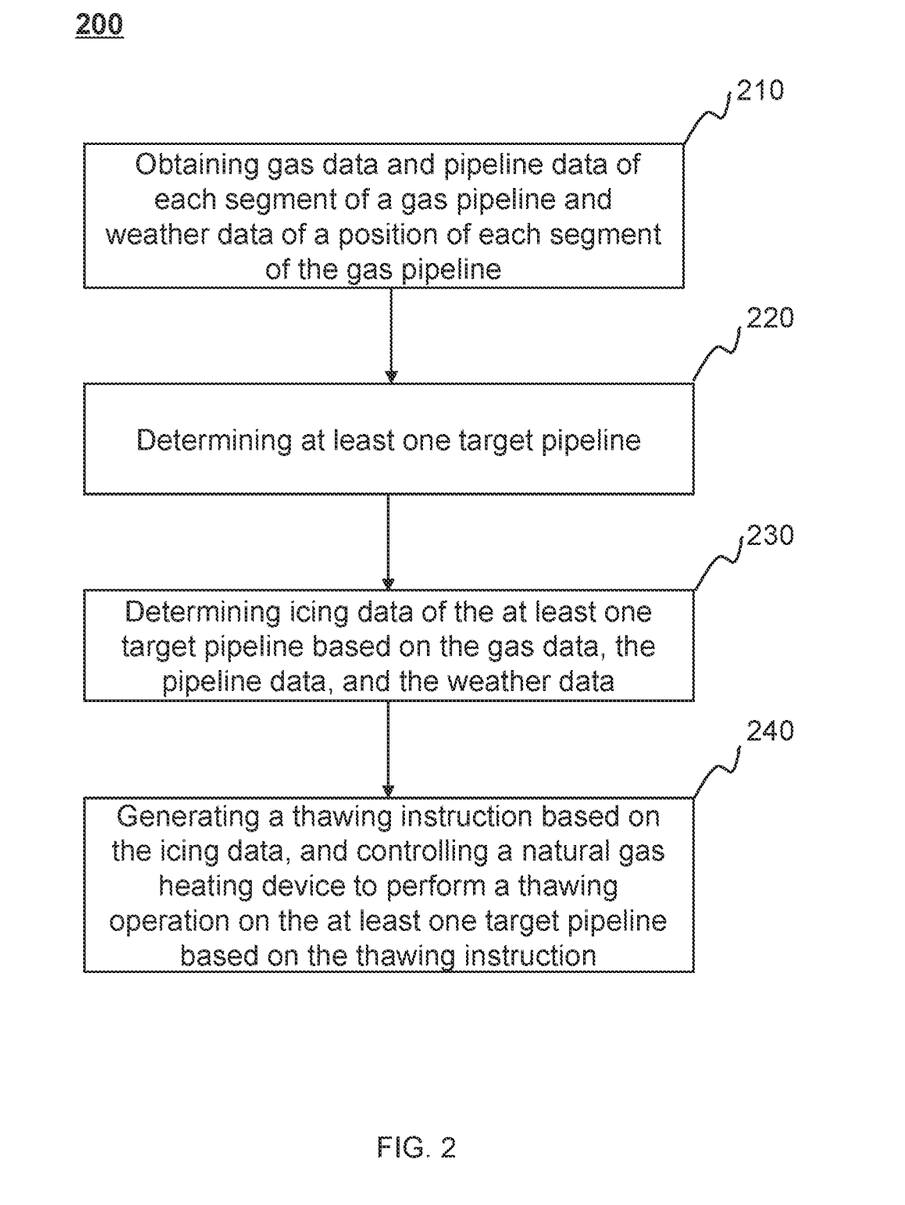
FIG. 2 is a flowchart illustrating an exemplary process of a method for maintaining a low-temperature pipeline based on smart gas according to some embodiments of the present disclosure.

FIG. 2 is a flowchart illustrating an exemplary process of a method for maintaining a low-temperature pipeline based on smart gas according to some embodiments of the present disclosure. As shown in FIG. 2, the process 200 may include the following operations. In some embodiments, the process 200 may be performed by the Internet of Things system 100 for maintaining a low-temperature pipeline based on smart gas (e.g., a smart gas safety management platform).

In 210, obtaining gas data and pipeline data of each segment of a gas pipeline and weather data of a position of each segment of the gas pipeline.

In order to facilitate locating part of the gas pipeline where a problem such as icing, frosting, etc. occurs, the complete gas pipeline may be segmented in various ways. It should be noted that the segmentation is not to segment the gas pipeline in reality, but to manage the gas pipeline in segments. Gas data and pipeline data of different segments of the gas pipeline may be the same.

The gas pipeline may be segmented in various ways. The gas pipeline may be segmented based on length. The value of the length may be preset, such as 50 m, 100 m, etc. The gas pipeline may also be segmented based on a geographical position of the pipeline, for example, pipeline segment A located at street A, etc.

The gas data may refer to data that characterizes a relevant feature of natural gas in the gas pipeline. The gas data may include impurity data, gas flow data, etc. The impurity data may include data such as a type, a content, a proportion, etc. of impurities contained in the natural gas. For example, the impurity data may include a content of water vapor contained in the natural gas and a proportion of water vapor to the natural gas. The gas flow data may refer to flow rates of natural gas at inlet and outlet ends of a gas main pipeline where each segment of gas pipeline is located. For example, the gas flow data may be "the flow rate of natural gas at the inlet end is 0.7 m/s, and the flow rate of natural gas at the outlet end is 0.75 m/s."

The gas data may be obtained in various ways. For example, the water vapor content data in the gas data may be obtained based on a water vapor detector. The gas flow data in the gas data may be obtained based on flow rate sensors disposed at the inlet and outlet ends of the gas main pipeline.

The pipeline data may refer to data that characterizes a relevant feature of the gas pipeline itself. The pipeline data may include pipeline position data, pipeline shape and material data, etc. The pipeline position data may include data such as a pipeline geographical position, a pipeline burial depth, etc. For example, the pipeline position data may be "at street A, with a depth of 1.2 m." The pipeline shape and material data may include data such as a pipeline wall material, a pipeline wall thickness, a pipeline inner diameter, etc. For example, the pipeline shape and material data may be that "the pipeline wall material is PE80, the pipeline wall thickness is 8 mm, and the pipeline inner diameter is 180 mm."

The pipeline data may be obtained in various ways. For example, a locator may be installed on each segment of gas pipeline, and the geographical position of the pipeline may be obtained based on the locator. As another example, the pipeline position data and the pipeline shape and material data may be obtained based on pipeline laying records. The pipeline laying records may include pipeline position data and pipeline shape and material data recorded when the pipeline is laid.

The weather data may refer to data that characterizes a relevant feature of weather of the geographical position where each segment of gas pipeline is located. The weather data may include temperature data, precipitation data (including rainfall data, snowfall data, etc.), etc. of the geographical position of the pipeline in a historical period of time before a current time. A length of the historical period of time may be preset, e.g., 7 days. Exemplarily, the weather data may be that "the temperature on a first day is 5° C., and the precipitation on the first day is 0; the temperature on a second day is −2° C., and the precipitation on the second day is 2 mm; . . . ; the temperature on a seventh day is −6° C., and the precipitation on the seventh day is 5 mm."

The weather data may be determined based on weather forecast information in the historical period of time before the current time.

In 220, determining at least one target pipeline.

The target pipeline may refer to a gas pipeline that has been iced and/or not been iced but has a possibility of icing determined from all the gas pipelines. In some embodiments, the target pipeline may also be any one or more gas pipelines randomly determined from all the gas pipelines.

In some embodiments, a smart gas pipeline network device object platform may include an icing sensing alarm device installed in each segment of pipeline. The icing sensing alarm device may generate alarm information when the pipeline is icy, and transmit the alarm information to the smart gas safety management platform through a smart gas pipeline network device sensor network platform. Accordingly, the smart gas safety management platform may determine the target pipeline based on the alarm information.

In some embodiments, the smart gas safety management platform may determine at least one target pipeline based on the temperature data in the weather data. The smart gas safety management platform may determine a pipeline whose average value of the temperature data in the historical period of time is less than a temperature threshold as the target pipeline. The temperature threshold may be a system default value, an empirical value, a manually preset value, or the like, or any combination thereof, which may be set according to an actual need and is not limited in the present disclosure.

In some embodiments of the present disclosure, the target pipeline that has been iced or not been iced but has the possibility of icing may be determined from all the gas pipelines, which can avoid performing subsequent predictive analysis on the non-iced pipeline and save calculation costs.

In 230, determining icing data of the at least one target pipeline based on the gas data, the pipeline data, and the weather data.

The icing data may refer to data related to pipeline icing. The icing data may include an icing volume, an icing duration, an icing position range, etc. of the pipeline. For example, the icing data of a target pipeline may be "200 cm$^3$, 20 h, 20 m," which may mean that the icing volume of the target pipeline is 200 cm$^3$, the icing duration is 20 h, and a length of a pipeline of the icing position range in the pipeline is 20 m.

In some embodiments, the smart gas safety management platform may determine the icing data of the target pipeline through a preset rule. Exemplarily, the preset rule may be that the icing data is positively correlated with the water vapor content data of the target pipeline, and negatively correlated with the temperature data. For example, the greater the proportion of water vapor to natural gas is and the lower the temperature of the geographical position where the target pipeline is located is, the greater the icing volume of the pipeline may be, the longer the icing duration may be, and the greater the icing position range may be.

In some embodiments, the smart gas safety management platform may process the gas data, pipeline data, and weather data of the target pipeline based on an icing prediction model, and determine the icing data of at least one target pipeline. Further description regarding the determining the icing data based on the icing prediction model may be found in FIG. 3 and related description thereof.

In 240, generating a thawing instruction based on the icing data, and controlling a natural gas heating device to perform a thawing operation on the at least one target pipeline based on the thawing instruction.

The thawing instruction may refer to instruction data for controlling the natural gas heating device to heat natural gas. The thawing instruction may include working parameters of the natural gas heating device. The working parameters of the natural gas heating device may include heating temperature, heating duration, heating frequency, etc. of the natural gas heating device. For example, the thawing instruction may be adjusting the working parameters of the natural gas heating device as "heating temperature of 50° C., heating duration of 1 hour each time, and heating frequency of 4 times/day."

The natural gas heating device may refer to a device having a function of heating natural gas. The natural gas heating device may be configured in the smart gas pipeline network device object platform. For example, the natural gas heating device may be installed at the inlet end of each gas main pipeline and/or inside the plurality of segments of gas pipeline.

In some embodiments, the smart gas safety management platform may determine the thawing instruction based on a preset comparison table between the icing data of the target pipeline and the working parameters of the natural gas heating device. The preset comparison table may include a plurality of different reference icing data and working parameters of the natural gas heating device corresponding to each reference icing data. The preset comparison table may be constructed based on prior knowledge or historical data (e.g., historical icing data of pipelines and historical working parameters of the natural gas heating device corresponding to the historical icing data). The determining the thawing instruction based on the preset comparison table between the icing data of the target pipeline and the working parameters of the natural gas heating device may include the following operations. The reference icing data that is similar to the icing data of the target pipeline in the preset comparison table may be determined by retrieving the preset comparison table based on the icing data of the target pipeline, and the thawing instruction may be determined based on the working parameters of the natural gas heating device corresponding to the reference icing data.

In some embodiments, the smart gas safety management platform may further determine the thawing instruction based on other means. Further description regarding the determining the thawing instruction may be found in FIG. 4 and related description thereof.

In some embodiments, after determining the thawing instruction, the smart gas safety management platform may further adjust the thawing instruction. Further description regarding the adjusting the thawing instruction may be found in FIG. 5 and related description thereof.

The thawing operation may refer to an operation in which the natural gas heating device heats the natural gas in the pipeline, thereby melting an icy part of the pipeline.

In some embodiments, the smart gas safety management platform may send the generated thawing instruction to the smart gas pipeline network device object platform through the smart gas pipeline network device sensor network platform. The smart gas pipeline network device object platform may control, based on the thawing instruction, the natural gas heating device at a position of the target pipeline to work according to the working parameters in the thawing instruction to realize the thawing operation.

In some embodiments of the present disclosure, the corresponding thawing instruction may be generated based on the icing condition of the pipeline to thaw the icing pipeline, which can realize intelligent thawing of the icing pipeline and save a lot of manpower and material resources.

It should be noted that the above description about the process 200 is merely provided for the purpose of illustration, and not intended to limit the scope of the present disclosure. For those skilled in the art, various modifications and variations may be made to the process 200 under the guidance of the present disclosure. However, those modifications and variations are still within the scope of the present disclosure. For example, the weather data of each segment of pipeline may be obtained first, the target pipeline may be determined based on the weather data, and the gas data and the pipeline data of the target pipeline may be obtained.

Figure 3:
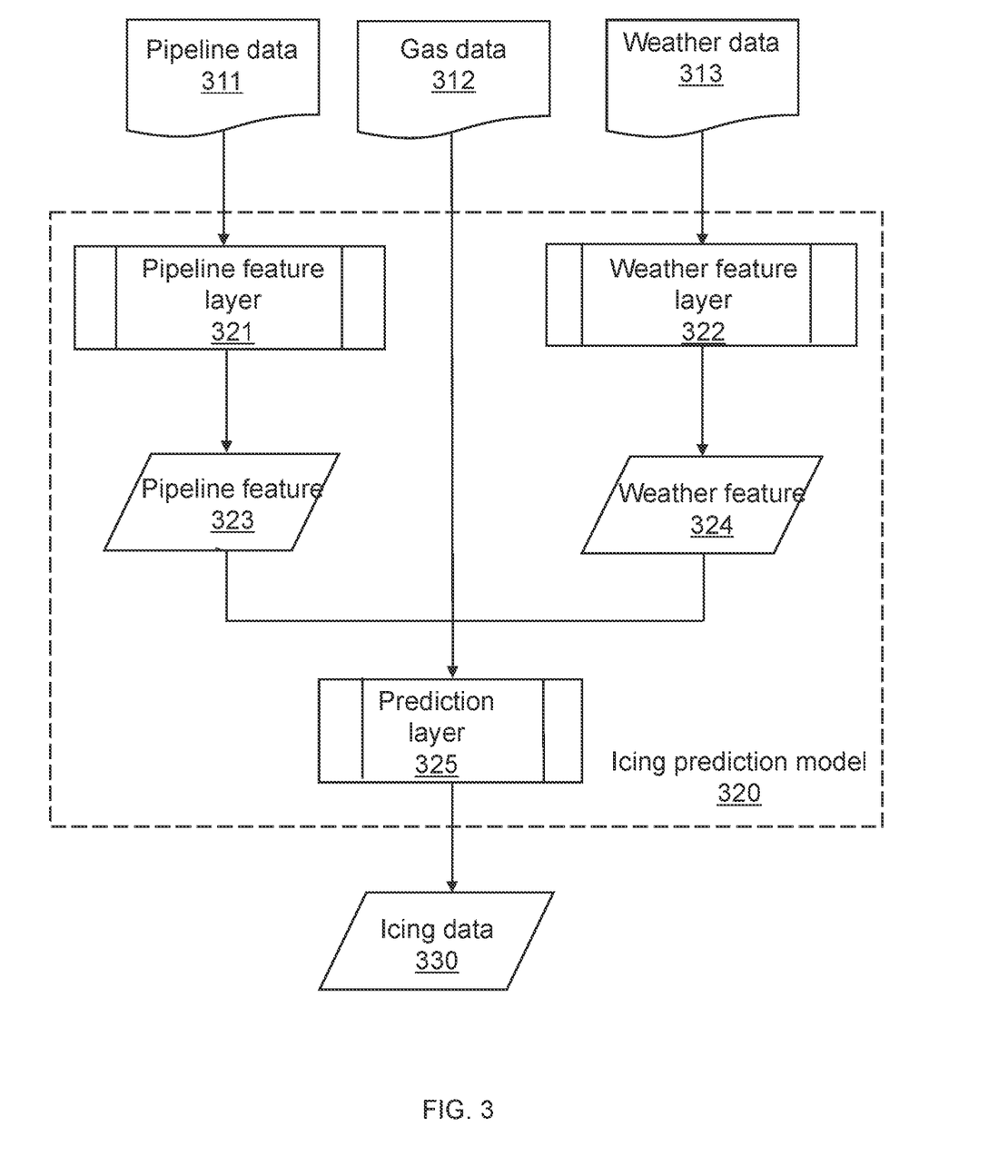
FIG. 3 an exemplary schematic diagram illustrating determining icing data based on an icing prediction model according to some embodiments of the present disclosure.

FIG. 3 is an exemplary schematic diagram illustrating determining icing data based on an icing prediction model according to some embodiments of the present disclosure.

In some embodiments, the smart gas safety management platform may determine the icing data of the at least one target pipeline by processing gas data, pipeline data, and weather data of at least one target pipeline based on the icing prediction model.

The icing prediction model may refer to a machine learning model configured to determine the icing data of the target pipeline. In some embodiments, the icing prediction model may include a recurrent neural networks (RNN) model, a deep neural networks (DNN) model, a convolutional neural networks (CNN) model, or the like, or any combination thereof.

As shown in FIG. 3, an input of the icing prediction model 320 may include gas data 312, pipeline data 311, and weather data 313 of the target pipeline, and an output of the icing prediction model 320 may be the icing data 330 of the target pipeline. Further description regarding the gas data, the pipeline data, and the weather data may be found in the operation 210 and related description thereof.

In some embodiments, the icing prediction model 320 may be obtained by training a plurality of first training samples with labels. For example, a plurality of first training samples with a first label may be input into an initial icing prediction model, a loss function may be constructed using the first label and a result of the initial icing prediction model, and parameters of the initial icing prediction model may be iteratively updated based on the loss function. When the loss function of the initial icing prediction model satisfies a preset condition of the end of training, the model training may be completed, and a trained icing prediction model may be obtained. The preset condition of the end of training may be that the loss function converges, a count of iterations reaches a threshold, etc.

In some embodiments, the first training sample may include sample pipeline data, sample weather data, and sample gas data of a plurality of sample target pipelines. The first label may include actual icing data corresponding to the plurality of sample target pipelines. The plurality of sample target pipelines may be gas pipelines that have historically been iced. The plurality of sample target pipeline and the sample pipeline data, the sample weather data, and the sample gas data of the plurality of sample target pipeline, and the actual icing data corresponding to the plurality of sample target pipeline may be obtained based on related data recorded during historical icing. The first label may be determined based on manual labeling.

In some embodiments, the icing prediction model may include a plurality of processing layers. As shown in FIG. 3, the icing prediction model 320 may include a pipeline feature layer 321, a weather feature layer 322, and a prediction layer 325.

The pipeline feature layer 321 may be configured to determine a pipeline feature 323 of the target pipeline by processing the pipeline data 311 of the target pipeline.

The pipeline feature may refer to a feature vector constructed based on the pipeline data. For example, the pipeline feature of the pipeline may be (A, 1.1, 100, 10, 220), which may mean that a geographical position of the target pipeline is located in area A, the pipeline burial depth is 1.1 m, the pipeline wall material is PE100, the pipeline wall thickness is 10 mm, and the pipeline inner diameter is 220 mm.

The weather feature layer 322 of the icing prediction model 320 may determine a weather feature 324 of the target pipeline by processing the weather data 313 of the target pipeline.

The weather feature may refer to a feature vector constructed based on the weather data. For example, the weather feature corresponding to a pipeline may be ([2, 0], [−1, 2], . . . , [−7, 6]), which may mean weather data in the historical period of time observed at the geographical position of the target pipeline may be that: the average temperature on a first day is 2° C., and the precipitation on the first day is 0; the average temperature on a second day is −1° C., and the precipitation on the second day is 2 mm; . . . ; the average temperature on a last day is −7° C., and the precipitation on the last day is 6 mm.

The prediction layer 325 may determine the icing data 330 of the target pipeline by processing the pipeline feature 323, the weather feature 324, and the gas data 312 of the target pipeline.

In some embodiments, the icing prediction model 320 may be obtained through joint training. The joint training may be performed based on the first training sample and the first label.

An exemplary joint training process may include the following operations. The sample pipeline data may be input into an initial pipeline feature layer to obtain a pipeline feature output by the initial pipeline feature layer. The sample weather data may be input into an initial weather feature layer to obtain a weather feature output by the initial weather feature layer. The pipeline feature output by the initial pipeline feature layer and the weather feature output by the initial weather feature layer may be taken as training sample data and input into an initial prediction layer as well as the sample gas data to obtain the icing data output by the initial prediction layer. A loss function may be constructed based on the first label and the icing data output by the initial prediction layer, and parameters of the initial pipeline feature layer, the initial weather feature layer, and the initial prediction layer may be updated synchronously. When the loss function satisfies a preset condition of the end of training, the model training may be completed, and a trained icing prediction model may be obtained. The preset condition of the end of training may be that the loss function converges, a count of iterations reaches a threshold, etc.

In some embodiments of the present disclosure, the predicting the icing data through the model can ensure prediction accuracy, improve prediction efficiency, and save time costs. At the same time, by jointly training the plurality of processing layers of the icing prediction model, the accuracy of the prediction result of the icing prediction model can be effectively improved.

Figure 4:
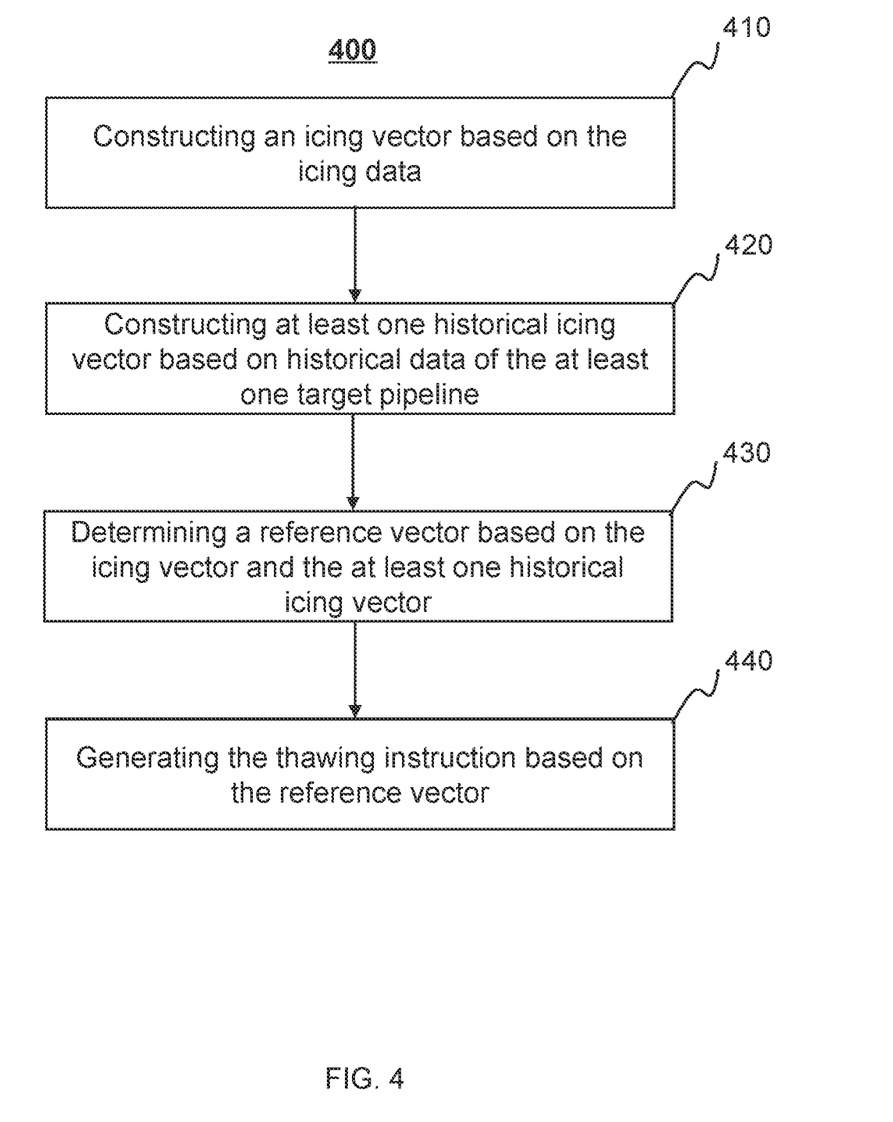
FIG. 4 is a flowchart illustrating an exemplary process for generating a thawing instruction according to some embodiments of the present disclosure.

FIG. 4 is a flowchart illustrating an exemplary process for generating a thawing instruction according to some embodiments of the present disclosure. In some embodiments, the process 400 may be performed by the Internet of Things system 100 for maintaining a low-temperature pipeline based on smart gas (e.g., a smart gas safety management platform).

In 410, constructing an icing vector based on icing data.

The icing vector may refer to a feature vector constructed based on the icing data of the target pipeline. The icing vector may reflect an icing condition of each segment of gas pipeline.

The way of constructing the icing vector may include the following operations. The icing data (e.g., an icing volume, an icing duration, an icing position range of the pipeline) of each segment of gas pipeline may be taken as an element of each dimension of the icing vector, that is, the vector element of each dimension of the icing vector may correspond to a kind of icing data of the target pipeline, and different element values may correspond to different icing conditions. Exemplarily, if the icing volume of target pipeline A is 300 $cm^3$, the icing duration of target pipeline A is 20 h, and a pipeline length in the icing position range of target pipeline A is 15 m, the icing vector of the target pipeline A may be (300, 20, 15).

In 420, constructing at least one historical icing vector based on historical data of at least one target pipeline.

The historical data may refer to data related to a historical icing condition of the target pipeline. In some embodiments, the historical data may include historical icing data of the at least one target pipeline and a historical thawing instruction corresponding to the historical icing data.

The historical icing data may refer to icing data of the at least one target pipeline at a certain time point in history. For example, the historical icing data of pipeline A at a time point in history (e.g., Dec. 23, 2020) may be that "the icing volume of the pipeline is 210 $cm^3$, the icing duration is 15 h, and the pipeline length in the icing position range is 11 m." Each kind of historical icing data may correspond to a historical thawing instruction. For example, the historical thawing instruction of pipeline A may be adjusting working parameters of a natural gas heating device as "heating temperature of 50° C., heating duration of 1 hour each time, and heating frequency of 4 times/day." The historical icing data and the historical thawing instruction may be obtained based on related data recorded during historical icing.

The historical icing vector may refer to data in the form of a vector constructed based on the historical icing data in the historical data. The historical icing vector may comprehensively reflect the icing condition of each segment of gas pipeline at a certain time point in history. The historical icing vector may be constructed in a similar way to the icing vector, which is not be repeated herein.

In 430, determining a reference vector based on the icing vector and the at least one historical icing vector.

The reference vector may refer to data in the form of a vector selected from the at least one historical thawing vector and may be configured to generate the thawing instruction subsequently.

In some embodiments, the smart gas safety management platform may determine a vector distance between a current icing vector and the at least one historical icing vector, and determine the historical icing vector corresponding to the vector distance that satisfies a preset condition as the reference vector. A way of determining the vector distance may include, but is not limited to, using a Euclidean distance, a Manhattan distance, a Chebyshev distance, etc.

The preset condition may include a judgment condition related to the vector distance, which may be used to screen a historical icing vector with a relative small vector distance from the reference vector. For example, the preset condition may be that the vector distance is smaller than a distance threshold or the vector distance is the smallest. The distance threshold may be a system default value, an empirical value, a manually preset value, or the like, or any combination thereof, which may be set according to an actual need, and is not limited in the present disclosure.

In some embodiments of the present disclosure, the reference vector may be determined from the historical data, which can improve adaptability of the selected reference vector to a current icing condition, so that the thawing instruction determined subsequently can be more suitable for a current thawing demand, thereby reducing the unnecessary energy waste.

In 440, generating the thawing instruction based on the reference vector.

In some embodiments, the historical thawing instruction corresponding to the reference vector may be determined as the thawing instruction for performing current thawing operation.

In some embodiments, if there is only one historical thawing vector (i.e., the determined reference vector) that satisfies the preset condition, the historical thawing instruction corresponding to the reference vector may be determined as the thawing instruction for performing the current thawing operation. If there is more than one historical icing vector that satisfies the preset condition, working parameters of the natural gas heating devices included in the historical thawing instructions corresponding to the plurality of historical icing vectors may be averaged as the thawing instruction for performing the current thawing operation.

In some embodiments, when the working parameters of the natural gas heating devices included in the historical thawing instructions corresponding to the plurality of historical thawing vectors are averaged, a weighted average manner may be used. A weight value corresponding to a set of working parameters of the natural gas heating device contained in each historical thawing instruction may be negatively correlated with the vector distance between the historical icing vector corresponding to the historical thawing instruction and the current icing vector.

In some embodiments of the present disclosure, the working parameters in the plurality of historical thawing instructions may be averaged, which can effectively weaken influence of an extreme case on a determined result. The working parameters in the current thawing instruction may be determined through the weighted average manner, so that the historical icing condition that is more similar to the current icing condition can have a greater impact on the result, and the result can be more in line with the actual need. The thawing instruction may be determined based on the data in the form of vector, so that the determined result can further satisfy an actual thawing requirement.

It should be noted that the above descriptions about the process 400 is merely provided for the purpose of illustration, and not intended to limit the scope of application of the present specification. For those skilled in the art, various modifications and variations may be made to the process 400 under the guidance of the present disclosure. However, those modifications and variations are still within the scope of the present disclosure.

Figure 5:
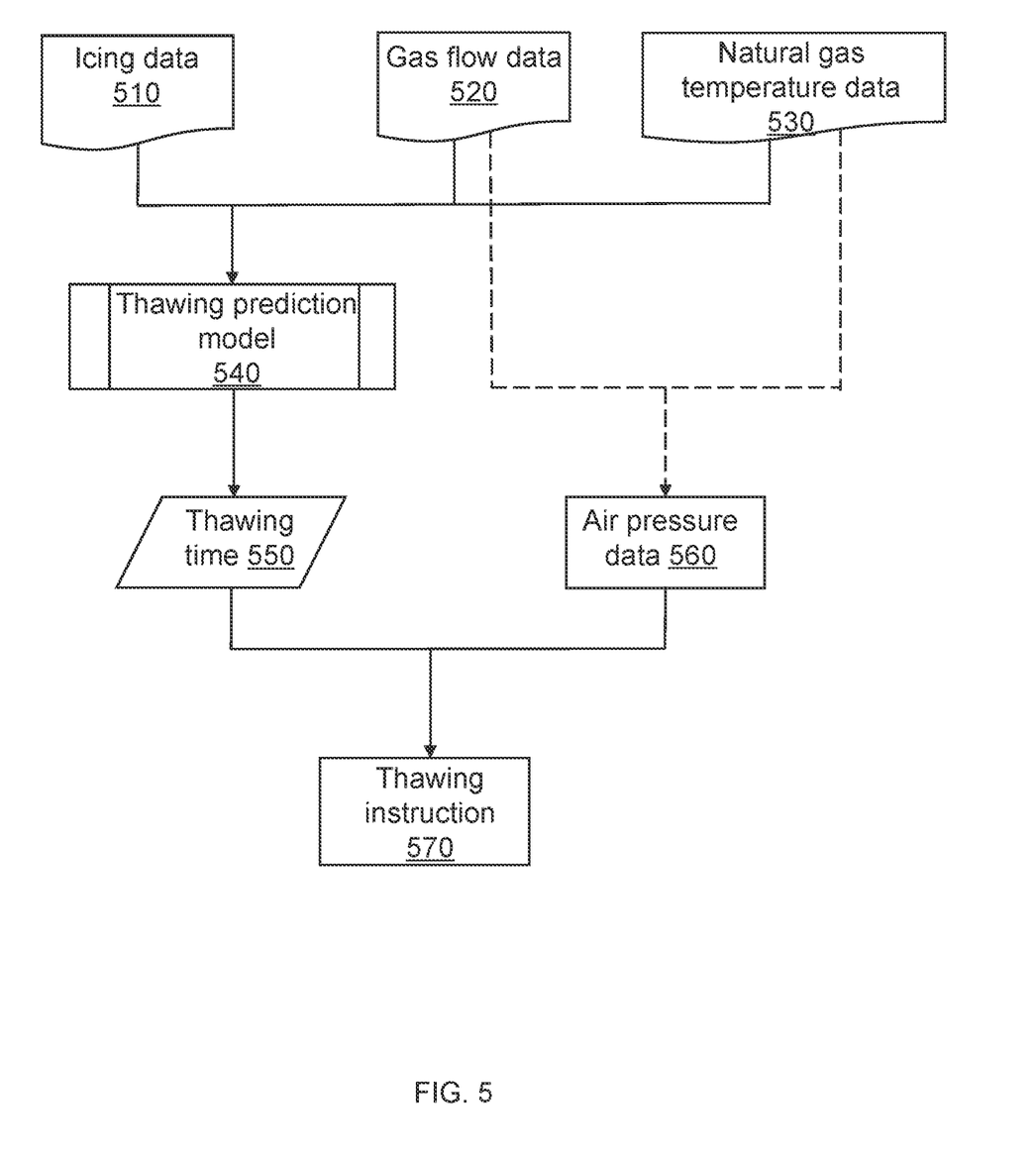
FIG. 5 is an exemplary schematic diagram illustrating adjusting a thawing instruction according to some embodiments of the present disclosure.

FIG. 5 is an exemplary schematic diagram illustrating adjusting a thawing instruction according to some embodiments of the present disclosure.

In some embodiments, after the thawing instruction is determined, the thawing instruction may also be adjusted. Adjusting the thawing instruction may include the following operations. Gas flow data 520 and natural gas temperature data 530 of the at least one target pipeline during a thawing process may be obtained. A thawing time 550 of the at least one target pipeline may be determined based on icing data 510, the gas flow data 520, and the natural gas temperature data 530. Air pressure data 560 of the at least one target pipeline may be determined based on the gas flow data 520 and the natural gas temperature data 530. The thawing instruction 570 may be adjusted based on thawing time 550 and the air pressure data 560. Further description regarding the gas flow data may be found in the operation 210 and related description thereof.

The natural gas temperature data may refer to data related to temperature of gas in a pipeline. The natural gas temperature data may include current temperature of the gas in the pipeline, a temperature change of the gas in the pipeline, etc. For example, the natural gas temperature data may be that "the current natural gas temperature in a target pipeline is 10° C., and the natural gas temperature in a target pipeline drops by 2° C. in the next hour."

The natural gas temperature data may be obtained in various ways. For example, the natural gas temperature data may be obtained by a temperature sensor installed on the target pipeline. The temperature sensor may include a thermocouple, resistance temperature detector (RTD), a thermistor, a semiconductor-based integrated circuit (IC), etc., which is not limited in the present disclosure.

The thawing time may refer to time required for the target pipeline to thaw under an unadjusted thaw instruction. For example, if the natural gas heating device is controlled to heat up under the current thawing instruction, the thawing time may be 30 minutes.

In some embodiments, the smart gas safety management platform may determine the thawing time 550 of at least one target pipeline by processing the icing data 510, the gas flow data 520, and the natural gas temperature data 530 based on the thawing prediction model 540.

The thawing prediction model may refer to a machine learning model configured to determine the thawing time. The thawing prediction model may be a machine learning model. For example, the thawing prediction model may include a recurrent neural networks model, a convolutional neural networks model, other custom model structures, or the like, or any combination thereof.

The thawing prediction model may be obtained based on training. A second training sample for training the thawing prediction model may be sample icing data, sample gas flow data, and sample natural gas temperature data of a plurality of sample gas pipelines. The second training sample may be obtained based on historical data. For example, the sample icing data, the sample gas flow data, and the sample natural gas temperature data of the sample gas pipelines may all be obtained based on related data recorded during historical icing. A second label may be an actual thawing time of each sample gas pipeline. The actual thawing time may be obtained based on the related data recorded during the historical icing. The second label may be obtained by manual labeling.

An exemplary training process may include the following operations. The sample icing data, the sample gas flow data, and the sample natural gas temperature data may be input into an initial thawing prediction model, a loss function may be constructed based on the second label and a result of the initial thawing prediction model, and parameters of the initial thawing prediction model may be iteratively updated by gradient descent or other manners based on the loss function. When a preset condition of the end of training is satisfied, the model training may be completed, and a trained thawing prediction model may be obtained. The preset condition of the end of training may be that the loss function converges, a count of iterations reaches a threshold, etc.

In some embodiments of the present disclosure, the thawing time of the target pipeline may be determined by the machine learning model, which is beneficial to the subsequent adjustment of the thawing instruction, and can ensure that the pipeline may be thawed efficiently.

The air pressure data may refer to data related to air pressure in a pipeline. The air pressure data may include current air pressure in the pipeline, a change of air pressure in the pipeline, etc. For example, the air pressure data may be that "the current air pressure in a target pipeline is 2000 kPa, and the air pressure in a target pipeline drops by 300 kPa in the next hour."

In some embodiments, the smart gas safety management platform may process the gas flow data and the natural gas temperature data in various ways to determine the air pressure data of the at least one target pipeline. For example, the air pressure data may be determined by a physical relationship with the gas flow data and the natural gas temperature data. Exemplarily, the gas pressure data may be calculated and determined by an ideal gas pressure equation $PV=nRT$, where P denotes the gas pressure data, V denotes a natural gas volume (V may be determined by a product of the flow rate of natural gas and the pipeline cross-segmental area in the gas flow data), T denotes the natural gas temperature data, n denotes a molar gas constant, and R denotes a gas constant, i.e., the air pressure data is negatively correlated with the gas flow data and positively correlated with the natural gas temperature data.

In some embodiments, the air pressure data may also be obtained in other ways. For example, the air pressure data may be obtained by an air pressure sensor installed on the gas pipeline. The air pressure sensor may include, but is not limited to, a resistive air pressure sensor, a capacitive air pressure sensor, etc.

In some embodiments, the smart gas safety management platform may adjust the thawing instruction based on the thawing time and the air pressure data in various ways. For example, the thawing instruction may be adjusted based on a preset comparison table based on changes of the thawing time and/or the air pressure data. The preset comparison table may include a plurality of time intervals and a plurality of air pressure intervals, and heating temperatures of a natural gas heating device under co-correspondence of the time intervals and the air pressure intervals. The preset comparison table may be obtained by constructing the correspondence among the plurality of different time intervals, the plurality of different pressure intervals, and the heating temperatures of the natural gas heating device based on prior knowledge or historical data (e.g., historical thawing data of the gas pipeline).

Exemplarily, the adjusting, based on the change of the thawing time and/or the air pressure data, the thawing instruction according to the preset comparison table may include the following operations. The plurality of time intervals and the plurality of air pressure intervals in the preset comparison table may be respectively matched based on the thawing time and the air pressure data of a certain target pipeline. The time interval in which the thawing time of the target pipeline is and the air pressure interval in which the air pressure data of the target pipeline is may be determined. A heating temperature of a natural gas heating device corresponding to the time interval and the air pressure interval together may be determined as the heating temperature of the natural gas heating device in the adjusted thawing instruction.

In some embodiments, the smart gas safety management platform may adjust a heating temperature of the natural gas heating device based on the thawing time and a time threshold, and/or adjust the heating temperature of the natural gas heating device based on the air pressure data and an air pressure threshold. The time threshold and the air pressure threshold may be system default values, empirical values, artificial preset values, or the like, or any combination thereof, which may be set according to an actual need, and are not limited in the present disclosure.

In some embodiments, adjusting the heating temperature of the natural gas heating device based on the thawing time and the time threshold may include increasing the heating temperature of the natural gas heating device when the thawing time of the target pipeline is greater than a time threshold (e.g., 20 h). Adjusting the heating temperature of the natural gas heating device based on the air pressure data and the air pressure threshold may include increasing the heating temperature of the natural gas heating device when the air pressure data of the target pipeline is smaller than an air pressure threshold (e.g., 2000 kPa). The time threshold and the air pressure threshold may be system default values, empirical values, artificial preset values, or the like, or any combination thereof, which may be set according to an actual need, and are not limited in the present disclosure.

In some embodiments, an adjustment range of the heating temperature of the natural gas heating device may be determined based on a range by which the thawing time exceeds the corresponding time threshold or a range by which the air pressure data is smaller than the corresponding air pressure threshold. For example, if the thawing time exceeds the corresponding time threshold by 10%, the heating temperature of the natural gas heating device may increase by 10%. As another example, if the pressure data is smaller than the corresponding pressure threshold by 10%, the heating temperature of the natural gas heating device may increase by 10%.

In some embodiments of the present disclosure, the heating temperature of the natural gas heating device may be adjusted based on the thawing time and the air pressure data of the target pipeline, and the thawing instruction may be further adjusted, which can prevent pipeline damage and dangerous situations caused by direct use of the thawing instruction.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for maintaining a low-temperature pipeline based on smart gas, implemented by a smart gas safety management platform of an Internet of Things system for maintaining the low-temperature pipeline based on smart gas, comprising:

obtaining gas data and pipeline data of each segment of a gas pipeline and weather data of a position of each segment of the gas pipeline;
determining at least one target pipeline;
determining icing data of the at least one target pipeline by processing the gas data, the pipeline data, and the weather data of the at least one target pipeline based on an icing prediction model, wherein the icing prediction model is a machine learning model;
generating a thawing instruction based on the icing data, including:
  constructing an icing vector based on the icing data;
  constructing at least one historical icing vector based on historical data of the at least one target pipeline, the historical data including historical icing data of the at least one target pipeline and a historical thawing instruction corresponding to the historical icing data;
  determining a reference vector based on the icing vector and the at least one historical icing vector; and
  generating the thawing instruction based on the reference vector;
controlling a natural gas heating device to perform a thawing operation on the at least one target pipeline based on the thawing instruction.

2. The method for maintaining the low-temperature pipeline based on smart gas of claim 1, wherein the icing prediction model comprises a pipeline feature layer, a weather feature layer, and a prediction layer;
the pipeline feature layer is configured to determine a pipeline feature of the at least one target pipeline by processing the pipeline data;
the weather feature layer is configured to determine a weather feature of the at least one target pipeline by processing the weather data; and
the prediction layer is configured to determine the icing data of the at least one target pipeline by processing the gas data, the weather feature, and the pipeline feature.

3. The method for maintaining the low-temperature pipeline based on smart gas of claim 1, further comprising:
obtaining gas flow data and natural gas temperature data of the at least one target pipeline during a thawing process;
determining a thawing time of the at least one target pipeline based on the icing data, the gas flow data, and the natural gas temperature data;
determining air pressure data of the at least one target pipeline based on the gas flow data and the natural gas temperature data; and
adjusting the thawing instruction based on the thawing time and the air pressure data.

4. The method for maintaining the low-temperature pipeline based on smart gas of claim 3, wherein the determining a thawing time of the at least one target pipeline based on the icing data, the gas flow data, and the natural gas temperature data comprises:
determining the thawing time of the at least one target pipeline by processing the icing data, the gas flow data, and the natural gas temperature data based on a thawing prediction model, wherein the thawing prediction model is a machine learning model.

5. The method for maintaining the low-temperature pipeline based on smart gas of claim 1, wherein the Internet of Things system for maintaining the low-temperature pipeline based on smart gas comprises a smart gas user platform, a smart gas service platform, a smart gas pipeline network device sensor network platform, and a smart gas pipeline network device object platform that interact in sequence, and the smart gas safety management platform comprises a smart gas pipeline network safety management sub-platform and a smart gas data center;

the smart gas data center obtains gas data and pipeline data of at least one gas pipeline and weather data of a position of the at least one gas pipeline through the smart gas pipeline network device sensor network platform, and sends the gas data and the pipeline data of the at least one gas pipeline and the weather data of the position of the at least one gas pipeline to the smart gas pipeline network safety management sub-platform, and the at least one gas pipeline is configured in the smart gas pipeline network device object platform; and the method further comprises:

sending, by the smart gas pipeline network safety management sub-platform, the thawing instruction to the smart gas data center, and sending the thawing instruction to the smart gas pipeline network device object platform corresponding to the at least one target pipeline through the smart gas service platform.

6. An Internet of Things system for maintaining a low-temperature pipeline based on smart gas, wherein the Internet of Things system comprises a smart gas user platform, a smart gas service platform, a smart gas safety management platform, a smart gas pipeline network device sensor network platform, and a smart gas pipeline network device object platform that interact in sequence, and the smart gas safety management platform comprises a smart gas pipeline network safety management sub-platform and a smart gas data center;

the smart gas data center obtains gas data and pipeline data of at least one gas pipeline and weather data of a position of the at least one gas pipeline through the smart gas pipeline network device sensor network platform, and sends the gas data and the pipeline data of the at least one gas pipeline and the weather data of the position of the at least one gas pipeline to the smart gas pipeline network safety management sub-platform, and the at least one gas pipeline is configured in the smart gas pipeline network device object platform; and the smart gas safety management platform is configured to perform operations including:

obtaining gas data and pipeline data of the at least one gas pipeline, and the weather data of the position of the at least one gas pipeline, determining at least one target pipeline;

determine icing data of the at least one target pipeline by processing the gas data, the pipeline data and the weather data of the at least one target pipeline based on an icing prediction model, wherein the icing prediction model is a machine learning model generating a thawing instruction based on the icing data, including constructing an icing vector based on the icing data;

constructing at least one historical icing vector based on historical data of the at least one target pipeline, wherein the historical data includes historical icing data of the at least one target pipeline and a historical thawing instruction corresponding to the historical icing data;

determining a reference vector based on the icing vector and the at least one historical icing vector; and generating the thawing instruction based on the reference vector;

sending the thawing instruction to the smart gas data center, and sending the thawing instruction to the smart gas pipeline network device object platform corresponding to the target pipeline through the smart gas pipeline network device sensor network platform to control a natural gas heating device to perform a thawing operation on the at least one target pipeline, wherein the natural gas heating device is configured in the smart gas pipeline network device object platform.

7. The Internet of Things system of claim 6, wherein the icing prediction model comprises a pipeline feature layer, a weather feature layer and a prediction layer;

the pipeline feature layer is configured to determine a pipeline feature of the at least one target pipeline by processing the pipeline data;

the weather feature layer is configured to determine a weather feature of the at least one target pipeline by processing the weather data; and the prediction layer is configured to determine the icing data of the at least one target pipeline by processing the gas data, the weather feature and the pipeline feature.

8. The Internet of Things system of claim 6, wherein the smart gas pipeline network safety management sub-platform is further configured to:

obtain gas flow data and natural gas temperature data of the at least one target pipeline during a thawing process;

determine a thawing time of the at least one target pipeline based on the icing data, the gas flow data, and the natural gas temperature data;

determine air pressure data of the at least one target pipeline based on the gas flow data and the natural gas temperature data; and adjust the thawing instruction based on the thawing time and the air pressure data.

9. The Internet of Things system of claim 8, wherein the smart gas pipeline network safety management sub-platform is further configured to:

determine the thawing time of the at least one target pipeline by processing the icing data, the gas flow data and the natural gas temperature data based on a thawing prediction model, wherein the thawing prediction model is a machine learning model.

10. A non-transitory computer-readable storage medium storing computer instructions, wherein when the computer instructions are executed by a processor, the method for maintaining a low-temperature pipeline based on smart gas of claim 1 is implemented.

* * * * *